(12) United States Patent
Nguyen et al.

(10) Patent No.: US 6,483,232 B1
(45) Date of Patent: Nov. 19, 2002

(54) AVIATION LANDING LAMP

(75) Inventors: Quy Nguyen, St. Petersburg, FL (US); John E. Powell, Largo, FL (US)

(73) Assignee: Amglo Kemlite Laboratories, Inc., Largo, FL (US)

( * ) Notice: Subject to any disclaimer, the term of this patent is extended or adjusted under 35 U.S.C. 154(b) by 250 days.

(21) Appl. No.: 09/616,580

(22) Filed: Jul. 14, 2000

(51) Int. Cl.$^7$ .......................... H01J 5/16; H01J 61/40; H01K 1/26; H01K 1/30

(52) U.S. Cl. ............ 313/113; 313/318.01; 313/318.02; 313/318.09

(58) Field of Search ................. 313/113, 25, 318.01, 313/318.02, 318.07, 318.08, 318.09, 318.11, 579, 623

(56) References Cited

U.S. PATENT DOCUMENTS

| | | |
|---|---|---|
| 3,067,357 A | 12/1962 | Fridrich |
| 3,243,634 A | 3/1966 | Mosby |
| 3,277,330 A | 10/1966 | Cooper, Jr. |
| 3,717,783 A | 2/1973 | Notelteirs et al. |
| 4,138,621 A * | 2/1979 | Downing et al. ............ 313/113 |
| 4,241,391 A * | 12/1980 | Pitkjaan et al. ............. 362/548 |
| 4,409,516 A | 10/1983 | Thomas et al. |
| 4,568,854 A * | 2/1986 | Westlund, Jr. et al. ...... 313/579 |
| 4,720,652 A | 1/1988 | DuBois, Jr. |
| 4,728,849 A * | 3/1988 | Morris et al. ................ 313/113 |
| 4,758,760 A * | 7/1988 | Cox et al. ....................... 313/43 |
| 4,810,932 A * | 3/1989 | Ahlgren et al. ............. 313/579 |
| 5,019,743 A * | 5/1991 | Olwert et al. ................. 313/25 |
| 5,138,219 A * | 8/1992 | Krisl et al. .................. 313/112 |
| 5,144,190 A * | 9/1992 | Thomas et al. ............. 313/113 |
| 5,506,471 A * | 4/1996 | Kosmatka et al. .......... 313/635 |
| 5,886,466 A | 3/1999 | Bell et al. |

* cited by examiner

Primary Examiner—Vip Patel
Assistant Examiner—Kevin Quarterman
(74) Attorney, Agent, or Firm—Larson & Larson, PA; James E. Larson

(57) ABSTRACT

The lamp has a borosilicate lens bonded to a gas tight envelope containing a protective gas. The envelope contains a high gloss reflective coating on an inner surface and has a bulb mounted on a pair of support posts. The bulb contains a coiled tungsten filament within a halogen gas tight envelope. The filament is axially connected on each side to a tungsten wire, a molybdenum foil and a protruding lead wire. Each lead wire penetrates the gas tight bulb envelope to an integral tulip shaped end portion of the bulb, each end portion enclosed by a brass end cap. A bore in the end cap permits an electrical conductor to be soldered to the protruding lead wire.

20 Claims, 5 Drawing Sheets

AVIATION LANDING LAMP

BACKGROUND OF THE INVENTION

The present invention relates to aircraft landing lights. More particularly, it refers to a sealed beam halogen light having a tulip shaped glass housing at each end of a filament envelope structure.

Commercial aircraft customarily have at least one halogen landing light on each wing. These lights have at least 600,000 beam candlepower and employ 28 volts. A-typical prior art bulb sold by SYLVANIA, Model Q4559 is shown in FIG. 1. In vibration testing indicative of air landings, such prior art bulbs tend to fail at 100 HZ and 5 G's stage of the test. Although ANSI specification require 100 hours constant beam for aircraft landing lights this is of academic interest since vibration in the field determines the life of an aviation landing lamp. An aviation landing lamp is needed that will withstand vibrations from a greater number of repeated landings without causing lamp failure.

SUMMARY OF THE INVENTION

We have developed an aircraft landing lamp that has increased durability and vibration resistance so that it will withstand a greater number of aircraft landings without causing failure.

The lamp of this invention has an improved bulb over the prior art aviation lamps. The inventive bulb has a sealed glass envelope containing a halogen gas, a tungsten filament bonded to a metal foil material at each side of the filament and a lead wire protruding from the foil outwardly through the glass envelope. The glass envelope has a tulip shaped integral end portion at a first and second end which is enclosed at both ends with a brass end cap. A wire conductor is soldered to the protruding lead wire within each end cap. A pair of spring tempered stainless steel support posts enclose the wire conductors and each attach through a sealed lamp reflector housing enclosing the bulb to a ferrule.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
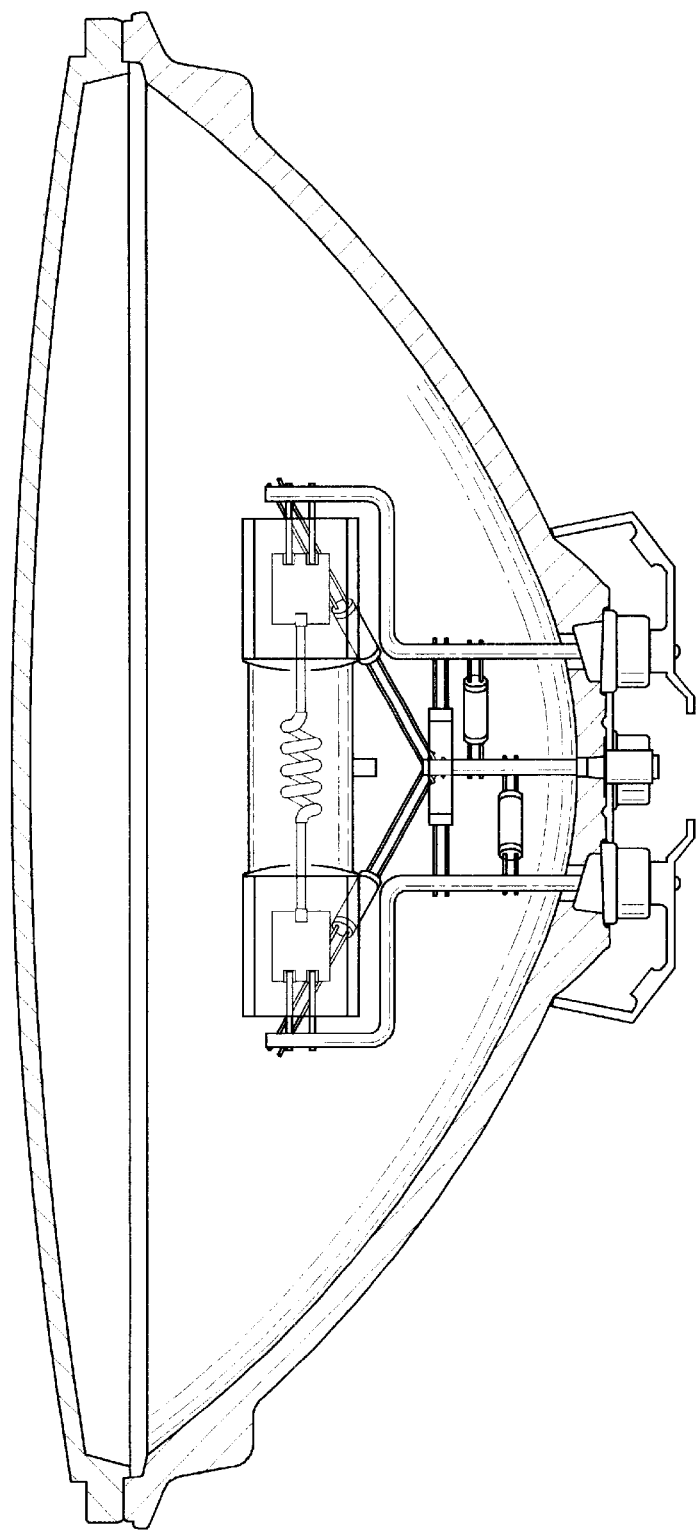
FIG. 1 is a side view of a prior art aviation landing light.

Throughout the following detailed description, the same reference numerals refer to the same elements in all figures.

Figure 2:
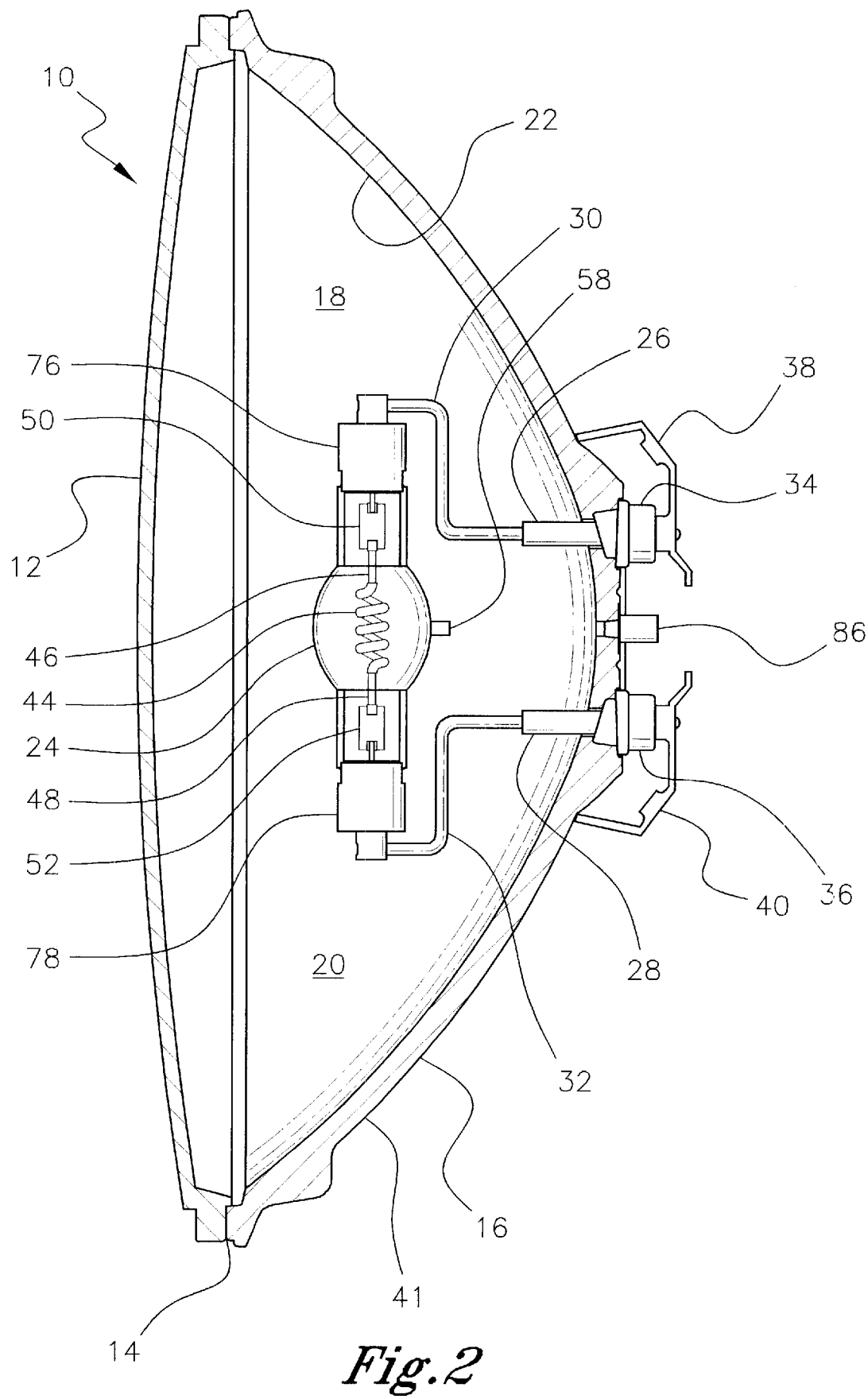
FIG. 2 is a side view of the aviation landing light of this invention.

The aviation landing lamp 10 shown in FIG. 2 has an annealed borosilicate lens 12 fused by a flame seal 14 to a generally parabolically-shaped glass reflector 16. For some uses the lens 12 can be made from a polycarbonate. The reflector 16 encloses a gas tight envelope 18 containing a protective, non-oxidizing gas such as nitrogen or an inert gas 20, such as argon. The reflector 16 has a high gloss aluminum coating 22 on its interior surface and a tip off portion 86 on its exterior surface 41. A bulb 24 is mounted to the reflector 16 by a pair of tapered terminal support posts 26 and 28 enclosing electrical conductors 30 and 32. The support post 26 is enclosed by a boss or ferrule 34 and support post 28 is enclosed by a boss or ferrule 36. Terminal frame supports 38 and 40 connect to ferrule 34 and 36 respectively adjacent outside surface 41 of reflector 16.

Figure 3:
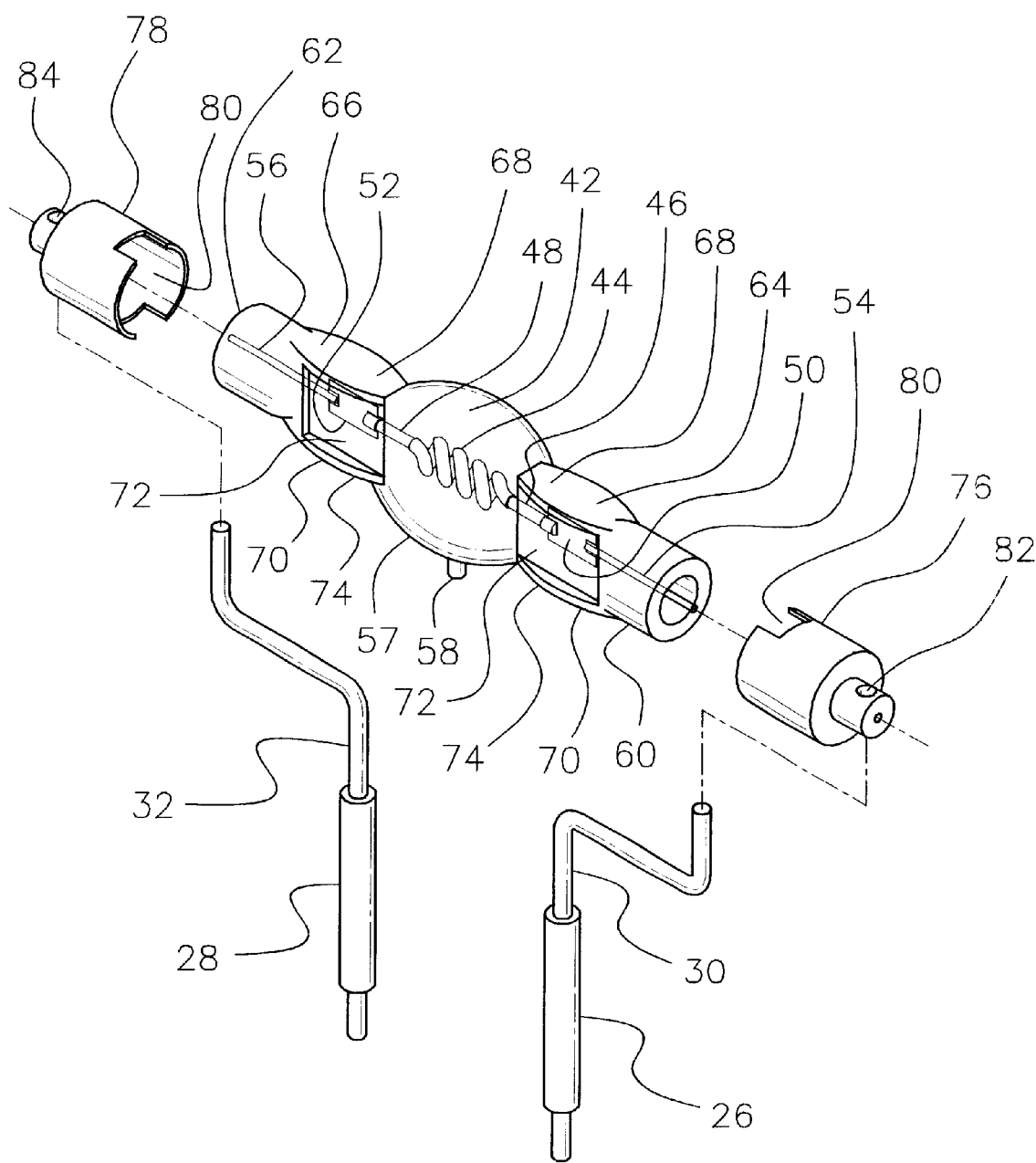
FIG. 3 is an exploded view of the improved bulb for the aviation landing light.
Figure 4:
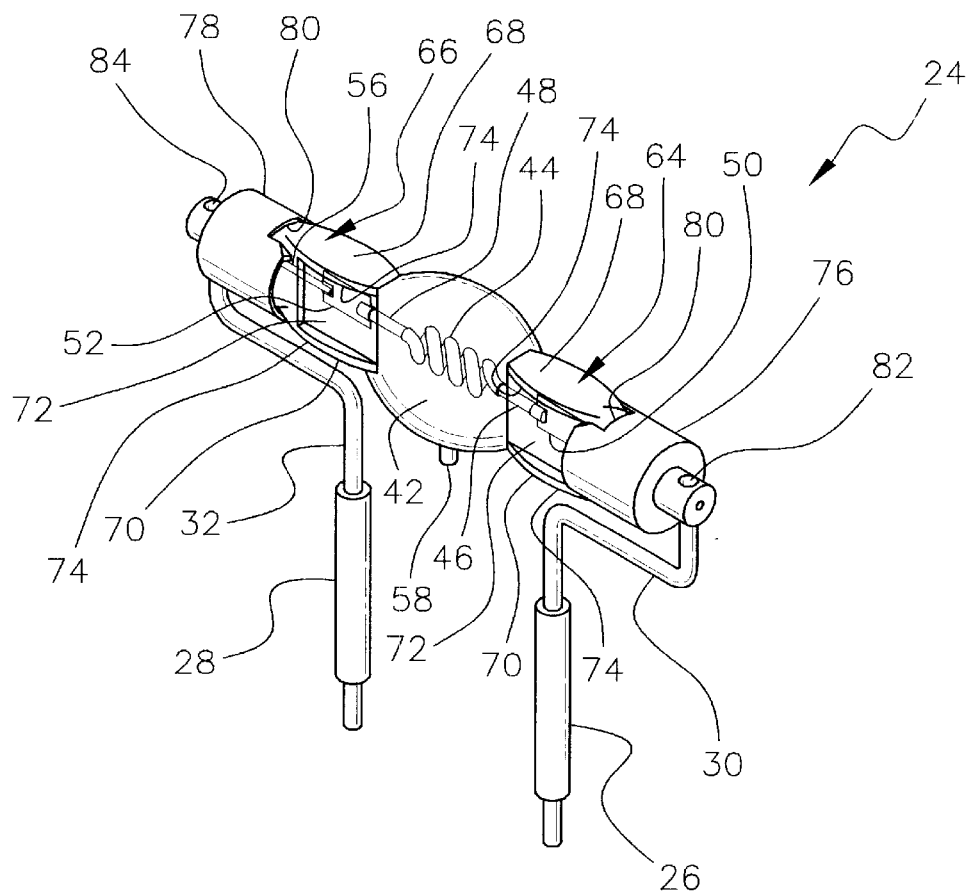
FIG. 4 is a perspective view of the aviation landing light bulb of this invention.
Figure 5:
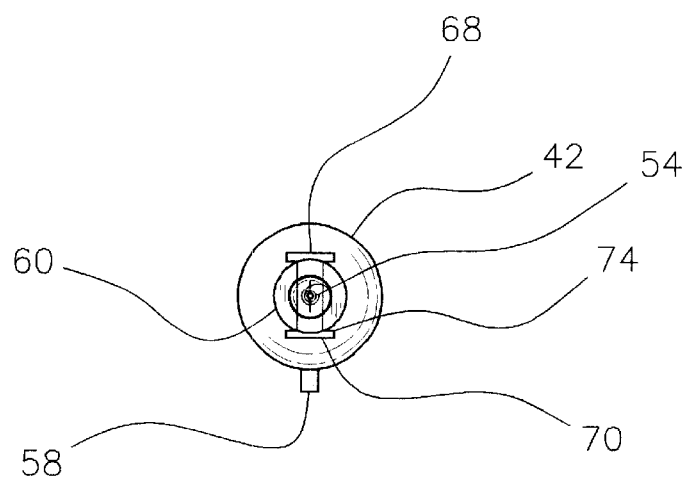
FIG. 5 is a perspective view of the bulb of FIG. 4 mounted within a reflector housing.
Figure 6:
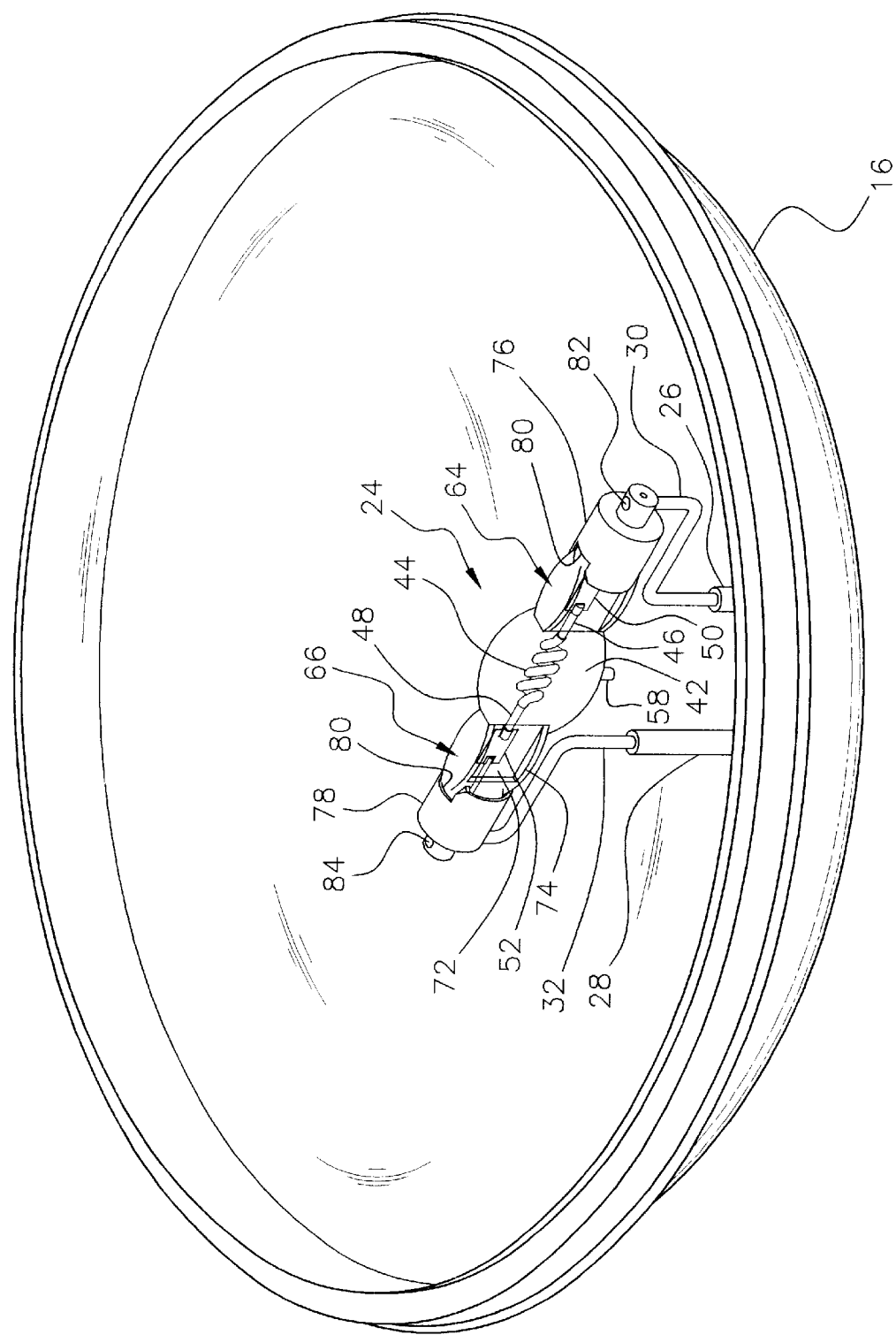
FIG. 6 is an end view of the bulb without the end cap.

The glass bulb 24 seen in detail in FIGS. 3 and 4 encloses a sealed envelope 42 containing a halogen gas. The envelope 42 also contains a tungsten filament coil 44 prepared by being coiled over a mandrel. The filament is capable of emitting at least 250 watts and preferably 600 watts. The tungsten filament 44 is attached at each end to a tungsten wire 46 and 48 respectively which are welded to a metal foil 50 and 52 respectively. The foils 50 and 52 are in turn welded to a protruding lead wire 54 and 56 respectively that pierce envelope 42. The bulb 24 has a quartz glass wall 57 with a tip off portion 58.

Tulip shaped glass ends 60 and 62 to the bulb 24 are integral with the portion 64 and 66 respectively of the bulb 24 that enclose the foil 50 and 52. Portions 64 and 66 of bulb 24 each have a top 68 and bottom 70. An indented wall 72 creates a lip 74 on each side of top 68 and bottom 70 surface.

End caps 76 and 78 enclose bulb ends 60 and 62 along with lead wires 54 and 56 respectively. A slot 80 on each end cap 76 and 78 press fits under lip 74 so that a proximal end of the bulb portion 64 and 66 fit within slot 80. The end caps 76 and 78 also could be crimped or spring loaded to the bulb portions 64 and 66. The shape of portions 64 and 66 is used to load the end caps. A nickel plated conductor 30 is threaded through bore 82 of end cap 76 and is silver soldered to protruding lead wire 54. In like manner nickel plated conductor 32 is threaded through bore 84 and is silver soldered to lead wire 56. The opposite end portion of conductor 30 is enclosed by tapered spring tempered stainless steel support post 26 which is silver soldered to conductor 30. In like manner the opposite end portion of conductor 32 is enclosed by tapered spring tempered stainless steel support post 28 and is silver soldered in place.

The brass end caps 76 and 78 can be made from other suitable compatible metal and can be nickel plated. The end caps and spring tempered stainless steel lamp supports 26 and 28 reduce and absorb torque and pressure on the electrical connections ensuring continuous continuity. It is expected that our improved aviation landing lamp will extend the lamp life from two to three times over prior art lamps during landings.

The bulb envelope containing halogen gas such as fluorine and reflector envelope containing nitrogen or an inert gas such as argon are made in a conventional fashion. The foil in the bulb can be made of molybdenum or other compatible metal.

Equivalent elements can be substituted for the bulb elements set forth above to achieve substantially the same results in substantially the same manner.

Having thus described the invention what is claimed and desired to be secured by Letters Patent is:

1. An aviation landing lamp having resistance to vibration comprising:
   a) a lens bonded to a gas tight enclosure containing a protective gas;
   b) the gas tight enclosure surrounded by a substantially parabolically-shaped reflector housing having a high gloss reflective coating on an inner surface;

c) a bulb mounted on a pair of support posts, the posts passing through bores in the reflector housing and in turn each post mounted on a ferrule attached to an outer surface of the reflector housing;

d) an exterior enclosure of the bulb surrounding a gas tight envelope containing a halogen gas and a coiled tungsten filament having a first and second end mounted within the envelope, the filament capable of emitting at least 250 watts, tungsten wire connecting the tungsten filament to a metal foil at both the first and second end of the tungsten filament, a protruding lead wire connected to each foil, the lead wires directed axially away from the tungsten filament;

e) the bulb gas tight envelope integral with a tulip shaped end portion at a first and second end of the bulb with a metal end cap enclosing each tulip shaped end portion; and f) a bore in each end cap for axially receiving the protruding lead wire for soldering to a first end of an electrical conductor, a second end of the electrical conductor soldered to the support post.

2. The aviation landing lamp according to claim 1 wherein the lens is borosilicate.

3. The aviation landing lamp according to claim 1 wherein the lens is polycarbonate.

4. The aviation landing lamp according to claim 1 wherein the lens is bonded to the gas tight enclosure with a flame seal.

5. The aviation landing lamp according to claim 1 wherein the high gloss reflective surface on the inner surface of the reflector is aluminum.

6. The aviation landing lamp according to claim 1 wherein the bulb foil is made from molybdenum.

7. The aviation landing lamp according to claim 1 wherein the metal end cap is made of brass.

8. An aviation landing lamp having resistance to vibration comprising:

a) a lens bonded to a gas tight enclosure containing a non-oxidizing gas;

b) the gas tight enclosure surrounded by a reflector housing having a high gloss reflective coating on an inner surface;

c) a bulb mounted within the reflector housing and attached to electrical conductors leading outside the reflector housing to electrical contacts;

d) the bulb having a first end and second end portion integral with a gas tight halogen gas containing envelope, a coiled tungsten filament within the gas tight envelope having a first and second end connected to a tungsten wire at the first and second end, a metal foil attached to the tungsten wire and a protruding wire passing through the gas tight envelope to the end portions from the foil axially and distal from the first and second end of the filament;

e) the bulb first and second end portions having a tulip shape and each end portion enclosed by a metal cap; and f) a bore in each end cap for axial receipt of the protruding lead wire soldered to an electrical conductor at each bore.

9. The aviation landing lamp according to claim 8 wherein the lens is borosilicate, the reflector coating is a high gloss aluminum and the metal foil in the bulb glass is molybdenum.

10. The aviation landing lamp according to claim 8 wherein the metal cap is made of brass.

11. The aviation landing lamp according to claim 8 wherein the electrical conductors are silver soldered to a pair of spaced apart support posts.

12. A bulb for use in an aviation landing lamp, the bulb comprising:

a) a gas tight envelope enclosing a halogen gas;

b) a tulip shaped end portion integral with a first and second end of the gas tight envelope;

c) a coiled tungsten filament having a first and second end, capable of emitting at least 250 watts, located in a center portion of the gas tight envelope;

d) a first and second tungsten wire attached axially to the first and second end of the filament;

e) an end of each tungsten wire distal from the tungsten filament electrically bonded to an electrically conductive metal foil at a first end of each foil;

f) a second end of each foil bonded to a protruding lead wire directed axially through the gas tight envelope to one end portion of the gas tight envelope; and g) a metal end cap enclosing each end portion axially and having a bore, the protruding lead wire soldered to an electrical conductor within the bore.

13. The bulb for use in an aviation landing lamp according to claim 12 wherein the halogen gas is fluorine.

14. The bulb for use in an aviation landing lamp according to claim 12 wherein the metal foil is molybdenum.

15. The bulb for use in an aviation landing lamp according to claim 12 wherein the metal end cap is made of brass.

16. The bulb for use in an aviation landing lamp according to claim 12 wherein the soldered lead wire is silver soldered.

17. The bulb for use in an aviation landing lamp according to claim 15 herein the end cap is nickel plated brass.

18. The bulb for use in an aviation landing lamp according to claim 12 wherein the metal end cap is crimped to the tulip shaped end portion.

19. The bulb for use in an aviation landing lamp according to claim 12 wherein the filament emits about 600 watts.

20. The bulb for use in an aviation landing lamp according to claim 12 wherein the end cap is press fit to the tulip shaped end portion.

* * * * *